United States Patent [19]

Kobayashi

[11] Patent Number: 4,969,014
[45] Date of Patent: Nov. 6, 1990

[54] DOCUMENT PLATEN MOVEMENT CONTROL DEVICE FOR AN ELECTROPHOTOGRAPHIC COPYING MACHINE

[75] Inventor: Masahiko Kobayashi, Yamatotakada, Japan

[73] Assignee: MITA Industrial Co., Ltd., Osaka, Japan

[21] Appl. No.: 267,556

[22] Filed: Nov. 7, 1988

[30] Foreign Application Priority Data

Nov. 12, 1987 [JP] Japan .................... 62-286703

[51] Int. Cl.⁵ .......................................... G03G 15/28
[52] U.S. Cl. .................................... 355/234; 355/75
[58] Field of Search ................. 355/230, 234, 233, 75

[56] References Cited

U.S. PATENT DOCUMENTS

| | | | |
|---|---|---|---|
| 3,672,762 | 6/1972 | Suzuki et al. | 355/234 |
| 4,129,374 | 12/1978 | Uchida et al. | 355/234 |
| 4,297,023 | 10/1981 | Nagoshi | 355/234 |
| 4,452,530 | 6/1984 | Koyama et al. | 355/234 X |
| 4,666,286 | 5/1987 | Kamitani et al. | 355/234 |

FOREIGN PATENT DOCUMENTS

| | | | |
|---|---|---|---|
| 56-14258 | 2/1981 | Japan | 355/234 |
| 63-91649 | 4/1988 | Japan | 355/234 |

Primary Examiner—Fred L. Braun
Attorney, Agent, or Firm—Beveridge, DeGrandi & Weilacher

[57] ABSTRACT

An electrophotographic copying machine in which the document platen is adapted to be moved to a maximum extent regardless of the size of a document, at the time of the last reproducing operation in a series of reproducing operations. Even though the slide rail mechanism for moving the document platent generates migration, the migration is eliminated by continuously moving the document platen to the maximum moving position after completion of the last exposure, thereby to produce no defective reproduction in the subsequent reproducing operations.

5 Claims, 9 Drawing Sheets

HOME POSITION

Fig. 7(B)

EXPOSURE START POSITION

EXPOSURE END POSITION
MOVED TO MAXIMUM EXTENT

Fig. 7(D)

EXPOSURE END POSITION
OF SMALL SIZE DOCUMENT

Fig. 8

DOCUMENT PLATEN MOVEMENT CONTROL DEVICE FOR AN ELECTROPHOTOGRAPHIC COPYING MACHINE

BACKGROUND OF THE INVENTION

The present invention relates to improvements in control of the movement of the document platen in an electrophotographic copying machine of the type in which the document platen is movable with respect to the machine body.

There is known an electrophotographic copying machine having a document platen movable with respect to the machine body. In the electrophotographic copying machine of this type, the document platen and the machine body are generally connected to each other by a slide rail mechanism. As the most commonly used slide rail mechanism, the mechanism under trademark ACCURIDE is known to those skilled in the art.

In the electrophotographic copying machine of this type, there are available two methods of controlling the movement of the document platen. According to one method, the moving distance of the document platen varies with the size of a document, whereas according to the other method, the document platen is moved to a maximum extent at all times regardless of the document size. For making a plurality of reproductions from a document, particularly from a small-size document, the former method is superior in shortened reproduction time to the latter. Accordingly, it is a general practice to employ the former method.

However, the electrophotographic copying machine employing the former method has sometime presented the problem that the slide rail mechanism such as ACCURIDE or the like is not smoothly moved when a larger-size document is reproduced after several reproductions of a smaller-size document have been made.

More specifically, the slide rail mechanism such as ACCURIDE has a longitudinal outer member extending in the moving direction of the document platen, an inner member slidable in the longitudinal direction of the outer member, and an intermediate member inserted between the outer and inner members. The intermediate member has spherical bodies for assuring smooth slide of the inner member with respect to the outer member. Generally, the outer member is attached to the document platen, while the inner member is attached to the machine body. When the document platen is moved, the outer member and the inner member are relatively moved through the intermediate member. However, when a plurality of reproductions are made from a document, for instance from a small-size document, the document platen is repeatedly subjected to advance at a relative slow exposure speed and retreat at a relative fast return speed in a predetermined range. In this case, the intermediate member will fail to follow the movement of the inner and outer members at the time when the movement of the document platen is switched from advance to retreat. This prevents the spherical bodies of the intermediate member from rotating between the outer and inner members, but causes these spherical bodies to slip therebetween. This results in alteration in the positional relationship between the outer member and the intermediate member or between the inner member and the intermediate member. That is, the intermediate member presents migration.

With the intermediate member presenting such migration, when intending to reproduce a document having a size larger than that of the document previously reproduced, the intermediate member presenting the migration is returned to the original state where the intermediate member presents no migration, with the movement of the outer member when the document platen is moved in the exposure direction exceeding the previous small-size document area. This generates sliding friction between the outer member and the spherical bodies of the intermediate member or between the inner member and the spherical bodies of the intermediate member. This applies a load to the document platen under exposure, causing exposure deviation, i.e., deviation of a reproduced image from the image to be reproduced. Thus, the reproduced image is impossible to read, or illegible.

SUMMARY OF THE INVENTION

It is an object of the present invention to provide an improved electrophotographic copying machine having a document platen movable with respect to the machine, in which migration, even if generated in the slide rail mechanism, exerts no influence upon reproduced images.

In the electrophotographic copying machine having a document platen movable with respect to the machine body of the present invention, the document platen and the machine body are connected by a slide rail mechanism having an outer member, an inner member and an intermediate member which are slidably combined with one another, and the document platen is adapted to be moved, in principle, by a distance corresponding to the size of a document mounted on the machine. The machine in accordance with the present invention is characterized by movement control means adapted to move the document platen to a maximum extent regardless of the size of the document, at the time of the last reproducing operation in a series of reproducing operations.

According to the present invention, the document platen is moved to a maximum extent at the time of the last reproducing operation in a series of reproducing operations, even though the slide rail mechanism presents migration due to a plurality of serial reproductions made from a relatively small sized document. By this movement to a maximum extent, the intermediate member presenting the migration is returned to the original state where the intermediate member presents no migration, thus eliminating the migration of the slide rail mechanism. At the time of elimination of migration, the sliding of the intermediate member causes a somewhat excessive load to be applied to the document platen under movement. However, it is after the exposure for the last reproduction in the series of reproducing operations has been completed that the load is applied. Consequently, no influence is exerted to the reproducing operation on a copy paper sheet.

The term of "a series of reproducing operations" refers to operations of serially reproducing, for example, one document on one or more copy paper sheets.

The following description will discuss in detail the advantages of the present invention with reference to the attached drawings.

DETAILED DESCRIPTION OF THE EMBODIMENTS

Figure 2:
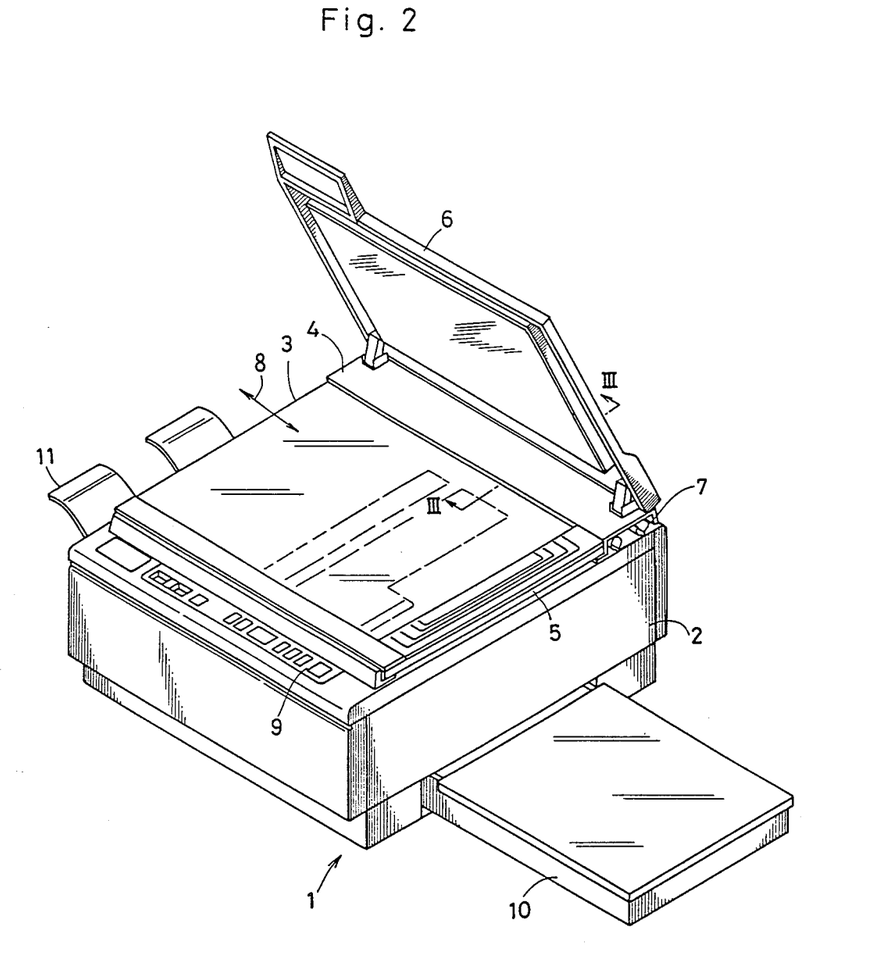
FIG. 2 is a perspective view illustrating the appearance of the electrophotographic copying machine in FIG. 1.

FIG. 2 is a perspective view illustrating the appearance of an electrophotographic copying machine in accordance with an embodiment of the present invention. As shown in FIG. 2, the electrophotographic copying machine 1 is provided on the body 2 thereof with a document platen 3. The document platen 3 is provided with a transparent platen 5 attached to a transparent platen mounting portion 4, and a cover 6 for covering the transparent platen 5. The entire document platen 3 is attached to the top surface of the machine body 2 through a slide rail 7. The slide rail 7 is adapted to move the document platen 3 transversely with respect to the machine body 2, i.e., in the direction shown by an arrow 8.

An example of the slide rail 7 includes the slide rail "ACCURIDE (registered trademark)" manufactured by Japan Accuride Co., Ltd.

The machine body 2 is provided at the upper front portion thereof with an operation panel 9 having a variety of operation buttons and display units. The machine body 2 is so arranged that a cassette 10 housing copy paper may be inserted into the lower portion of the right lateral side of the machine body 2 and that a discharge tray 11 for receiving copy paper on which image reproduction has been made, may be attached to the left lateral side of the machine body 2.

Figure 3:
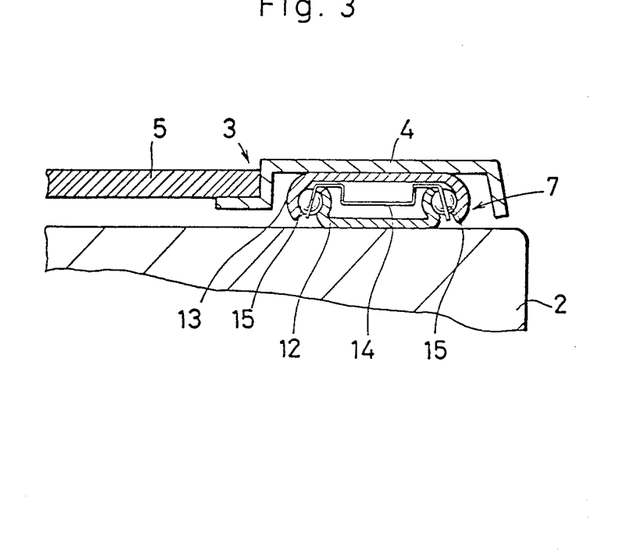
FIG. 3 is an end view of a portion taken out along the line III—III in FIG. 2.

FIG. 3 is an end view of a portion taken along the line III—III in FIG. 2. The slide rail 7 includes an inner member 12 attached to the top surface of the machine body 2, an outer member 13 attached to the underside of the transparent platen mounting portion 4 and an intermediate member 14 between the inner member 12 and the outer member 13. The intermediate member 14 rotatingly holds spherical bodies 15 such as steel balls or the like which come in contact with both inner and outer members 12 and 13.

Accordingly, the document platen 3 including the outer member 13 may be slid transversely with respect to the machine body 2 including the inner member 12 (in a direction at right angle to the paper plane in FIG. 3). In this sliding operation, only a rolling friction due to the spherical bodies 15 is present between the document platen 3 and the machine body 2. This enables the document platen 3 to be slid very smoothly with respect to the machine body 2.

Figure 4:
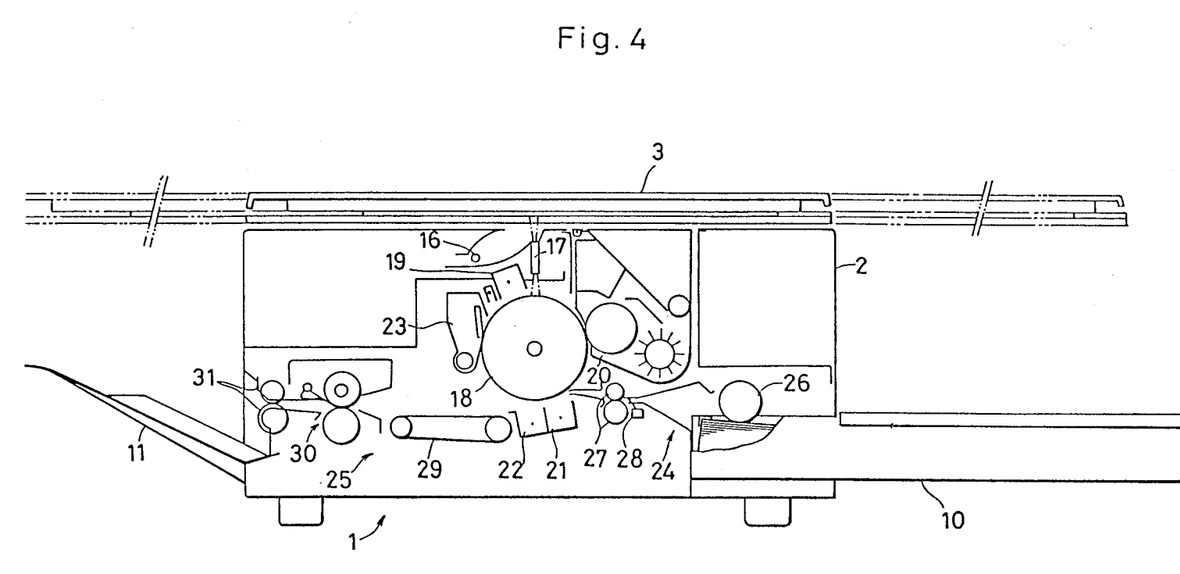
FIG. 4 is a schematic view illustrating the front side of the electrophotographic copying machine in FIG. 2.

FIG. 4 is a view in front elevation of the electrophotographic copying machine 1. In FIG. 4, the document platen 3 is transversely moved with the cover closed as shown by two dot chain lines, and the inner arrangement of the electrophotographic copying machine 1 is schematically shown.

The following description will discuss in brief the arrangement and schematic operations of the electrophotographic copying machine 1 with respect to FIG. 4.

The machine body 2 incorporates an optical system including an exposure lamp 16 for exposing a document and a focusing lens 17 for focusing the light reflected from the document. The optical system is opposite to the movable document platen 3.

A photoreceptor drum 18 is also disposed for forming an electrostatic latent image based on the light focused by the focusing lens 17. Disposed around the photoreceptor drum 18 are a corona discharger 19, a developing device 20, a transferring corona discharger 21, a separating corona discharger 22 and a cleaner 23. The corona discharger 19 is disposed for uniformly charging, with electricity, the photoreceptor layer on the surface of the photoreceptor drum 18. When the light from the focusing lens 17 is irradiated on the photoreceptor layer thus evenly charged with electricity, an electrostatic latent image is formed according to the irradiated light. The developing device 20 is disposed for developing the electrostatic latent image with toner adsorbed on the surface of the photoreceptor drum 18. The transferring corona discharger 21 is disposed for transferring a toner image formed on the surface of the photoreceptor drum 18, to copy paper. The separating corona discharger 22 is disposed for separating the copy paper on which the toner image has been transferred, from the surface of the photoreceptor drum 18. The cleaner 23 is disposed for collecting the toner remaining on the surface of the photoreceptor drum 18.

The electrophotographic copying machine 1 is also provided with a paper feed mechanism 24 for delivering copy paper in association with the rotation of the photoreceptor drum 18, and a delivery/fixing mechanism 5. The paper feed mechanism 24 includes a paper feed roller 26 for taking out copy paper from the cassette 10, and a pair of resist rollers 27 for feeding copy paper to the photoreceptor drum 18 in good timing. Disposed immediately upstream of the resist rollers 27 is a resist switch 28 for making sure of the presence of copy paper to be fed. The resist switch 28 is adapted to be turned ON and OFF, respectively, when the tip and rear end of copy paper fed is detected.

The delivery/fixing mechanism 25 includes a delivery belt 29 for delivering the copy paper onto which a toner image has been transferred, a fixing device 30 for fixing the transferred toner image, and a pair of discharge rollers 31 for discharging the copy paper on which the toner image has been fixed, to the discharge tray 11.

The following description will discuss a series of general reproducing operations of the electrophotographic copying machine 1.

When the reproducing operation starts, the photoreceptor drum 18 is rotated clockwise in FIG. 4. In association with this rotation, the document platen 3 is moved for exposure. The paper feed mechanism 24 starts paper feeding. When the light reflected from the document is applied to the surface of the photoreceptor drum 18 which has been uniformly charged with electricity by the corona discharger 19, an electrostatic latent image of the document is formed. The developing device 20 gives toner to the electrostatic latent image thus formed, which is then developed. In synchronism with the development, the resist rollers 27 starts paper feeding. The copy paper sticks to the surface of the photoreceptor drum 18 on which the electrostatic latent image has been developed, and the toner image is then transferred to the copy paper by the transferring corona discharger 21. This copy paper is separated from the surface of the photoreceptor drum 18 by the separating corona discharger 22. The copy paper is then sent to the delivery/fixing mechanism 25, in which the toner image is fixed by the fixing device 30. Then, the copy paper is discharged to the discharge tray 11 by the discharge rollers 31. The surface of the photoreceptor drum 18 from which the copy paper has been separated, is cleaned by the cleaner 23. The surface of the photoreceptor drum 18 is again charged with electricity by the corona discharger 19.

Figure 5:
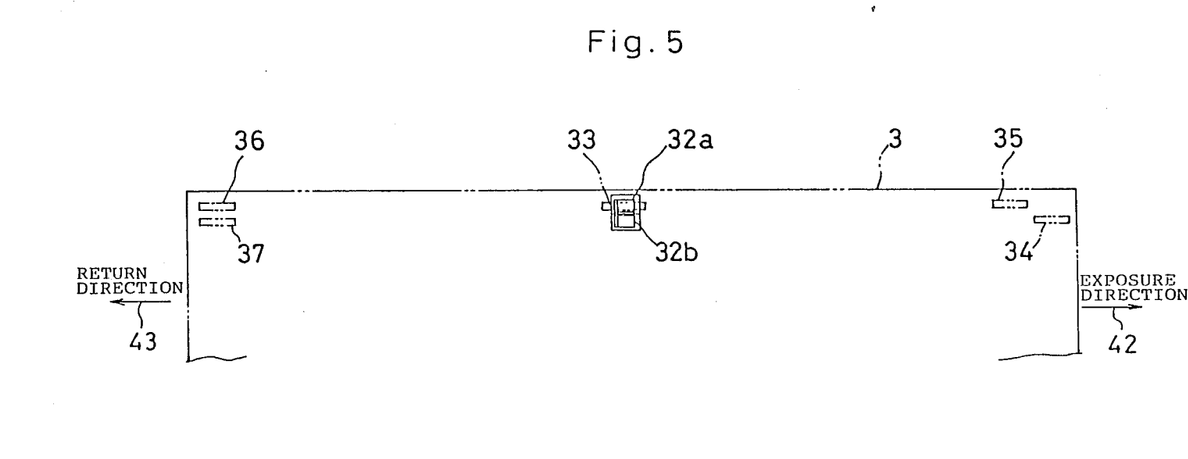
FIG. 5 is a schematic plan view illustrating an example of a document platen position detector mechanism.

The following description will discuss how the position detector mechanism is operated when the document platen 3 is moved, with reference to FIG. 5.

FIG. 5 is a plan view schematically illustrating the position detector mechanism of the document platen 3. The position detector mechanism has a pair of position detector switches 32a, 32b disposed, for example, on the top surface of the machine body, and projections 33 to 37 formed at predetermined positions under the document platen 3.

The following description will discuss the positional relationship between the detector switches 32a, 32b and the projections 33 to 37.

When the document platen 3 is located in a predetermined home position (shown by two dot chain lines in FIG. 5), the projection 33 pushes the position detector switch 32a. When the document platen 3 is moved in a return direction 43 and arrives at an exposure start position, the projection 34 pushes the position detector switch 32b. Immediately after the document platen 3 starts moving in an exposure direction 42 from the exposure start position, the projection 35 pushes the position detector switch 32a such that the tip of the document is recognized. When the document platen 3 is moved to a maximum extent in the exposure direction 42, the actuator projections 36 and 37 push the position detector switches 32a and 32b, respectively. This enables to detect the position of the document platen 3 based on outputs from the position detector switches 32a, 32b.

Figure 6:
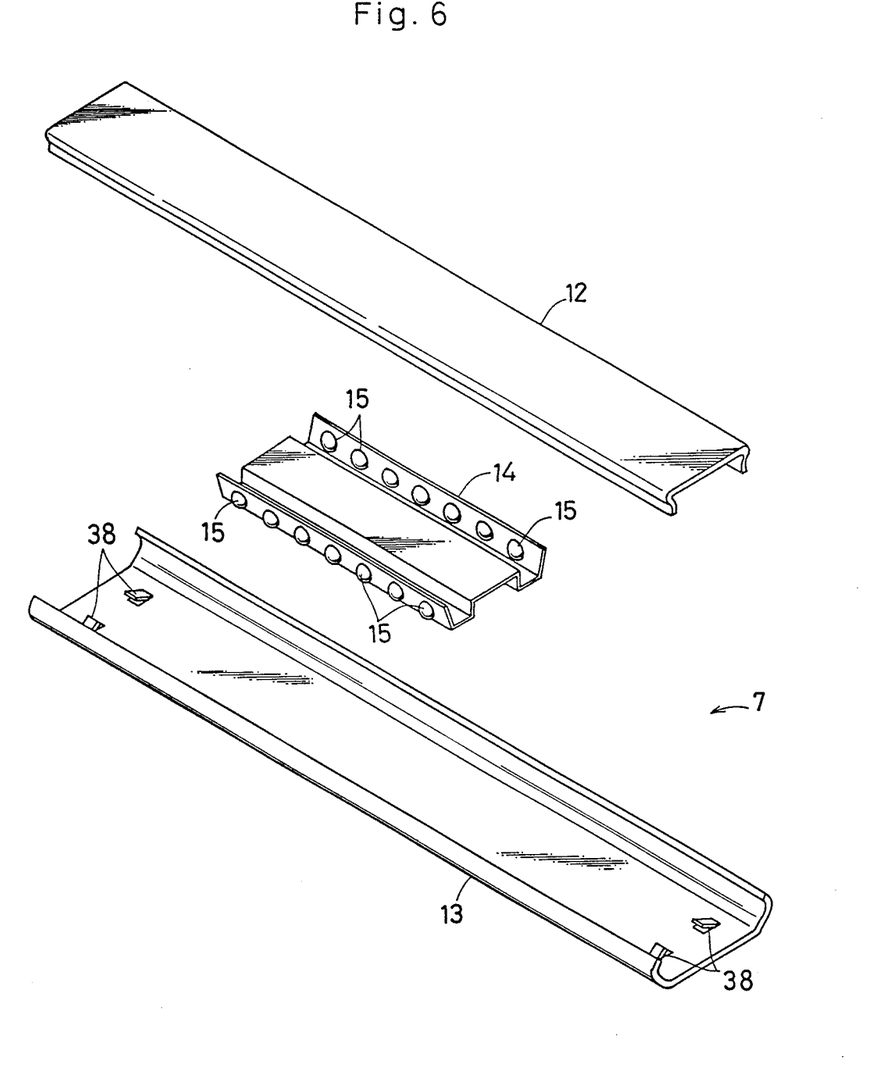
FIG. 6 is a perspective exploded view of a slide rail.

FIG. 6 is a perspective exploded view of the slide rail 7. For convenience sake, the slide rail 7 is shown with upside down, as compared with the arrangement in which the slide rail 7 is actually mounted on the electrophotographic copying machine as shown in FIG. 3.

Each of the inner member 12 and the outer member 13 of the slide rail 7 is a longitudinal member having a substantially C-shape section. These members 12 and 13 are assembled such that the respective C-shape open surfaces are opposite to each other. The inner member 12 and the outer member 13 have the substantially same length. The intermediate member 14 has a length about half of that of the inner and outer members 12 and 13. Each of the turned lateral sides at both ends in the widthwise direction rotatably holds a plurality of spherical bodies 15 (seven spherical bodies in FIG. 6). The outer member 13 is provided in the vicinity of the tip and rear ends thereof with projections 38 for limiting the movement of the intermediate member 14.

The slide rail 7 is formed by combining the inner member 12, the outer member 13 and the intermediate member 14 as shown in FIG. 3. The slide rail 7 is adapted to slide with the predetermined positional relationship among these three members maintained.

FIG. 7 illustrates the document platen 3 as moved to different positions for image reproduction, and the positional relationship among the inner member 12, the outer member 13 and the intermediate member 14 of the slide rail 7 at each of the positions of the document platen 3. FIGS. 7 (A) to (D) show the positions of the document platen 3, while (a) to (d) respectively show the positions of the slide rail located in association with the movement of the document platen 3 to the positions (A) to (D).

When the document platen 3 is in the home position as shown in FIG. 7 (A), the outer member 13 of the slide rail 7 fully overlaps the inner member 12, and the intermediate member 14 is located at the center in the longitudinal direction of the overlapping outer member 13 and the inner member 12, as shown in FIG. 7 (a).

When the document platen 3 is moved to the exposure start position as shown in FIG. 7 (B), the outer member 13 of the slide rail 7 is slid left substantially to a maximum extent, and a little over the left-half portion of the inner member 12 overlaps a little over the right-half portion of the outer member 13 with the intermediate member 14 located at the center of these overlapping portions, as shown in FIG. 7 (b).

When the document platen 3 is moved to a maximum extent in the exposure direction as shown in FIG. 7 (C), the outer member 13 of the slide rail 7 is moved right substantially to a maximum extent, and a little over the right-half portion of the inner member 12 overlaps a little over the left-half portion of the outer member 13 with the intermediate member 14 located at the center of these overlapping portions, as shown in FIG. 7 (c).

When the document to be reproduced is in a small size and the document platen 3 is repeatedly returned to the exposure start position after moved in the exposure direction up to, for example, the position shown by FIG. 7 (D), this may cause a positional migration of the intermediate member 14 of the slide rail 7 with respect to the inner member 12 and the outer member 13, as shown in FIG. 7 (d). More specifically, when the inner member 13 overlaps the outer member 12 as shown in FIG. 7 (d), the intermediate member 14 should be normally located at a position shown by a two dot chain line 14a, i.e., the center of the overlapping portions of the inner member 12 and the outer member 13. However, if the migration occurs, the intermediate member 14 is positionally shifted to a position shown by a solid line.

If such a positional shift occurs, when a larger-size document is then reproduced, the outer member 13 slides while the projections 38 (FIG. 6) drag, from the halfway of sliding, the intermediate member 14 presenting the migration. Accordingly, in this embodiment the movement of the document platen 3 is controlled in the following manner.

Figure 8:
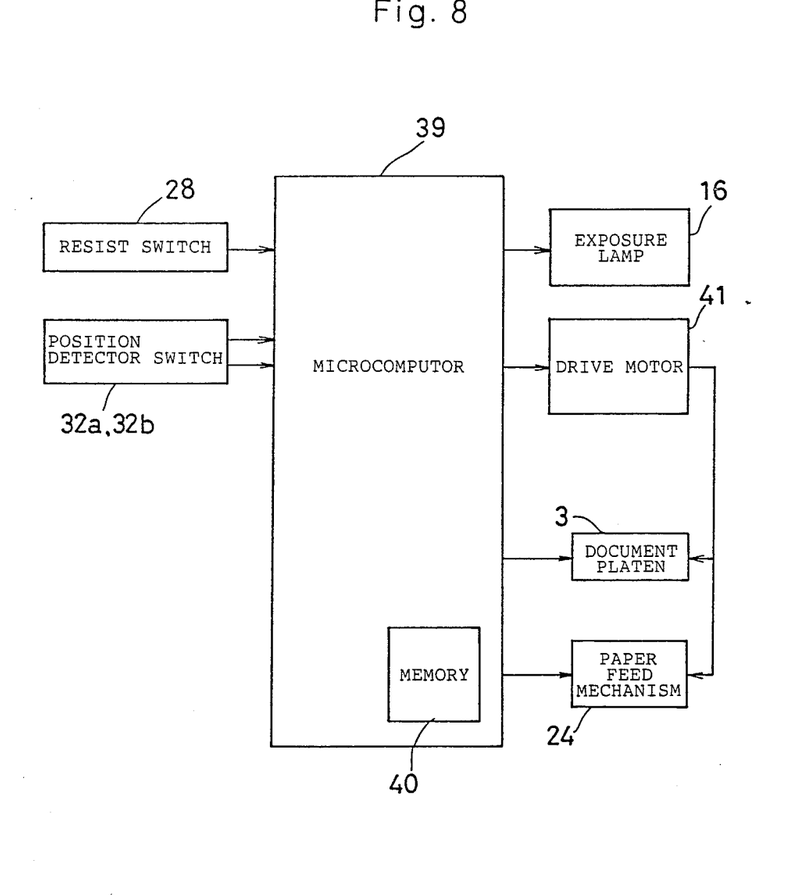
FIG. 8 is a block diagram of the control unit of the electrophotographic copying machine of the invention.

FIG. 8 is a schematic block diagram of the control unit of the electrophotographic copying machine 1, illustrating only the members necessary for control operation in accordance with the feature of this embodiment.

As shown in FIG. 8, the control processing is executed by a microcomputer 39. The microcomputer 39 includes a memory 40 in which necessary operational programs and data have been previously stored or are to be stored as necessary. Signals from the resist switch 28 and the position detector switches 32a, 32b are given to the microcomputer 39. The microcomputer 39 executes a control processing based on the signals thus entered and the operational programs, thereby to control the exposure lamp 16, a drive motor 41, the document platen 3 and the paper feed mechanism 24.

Figure 1:
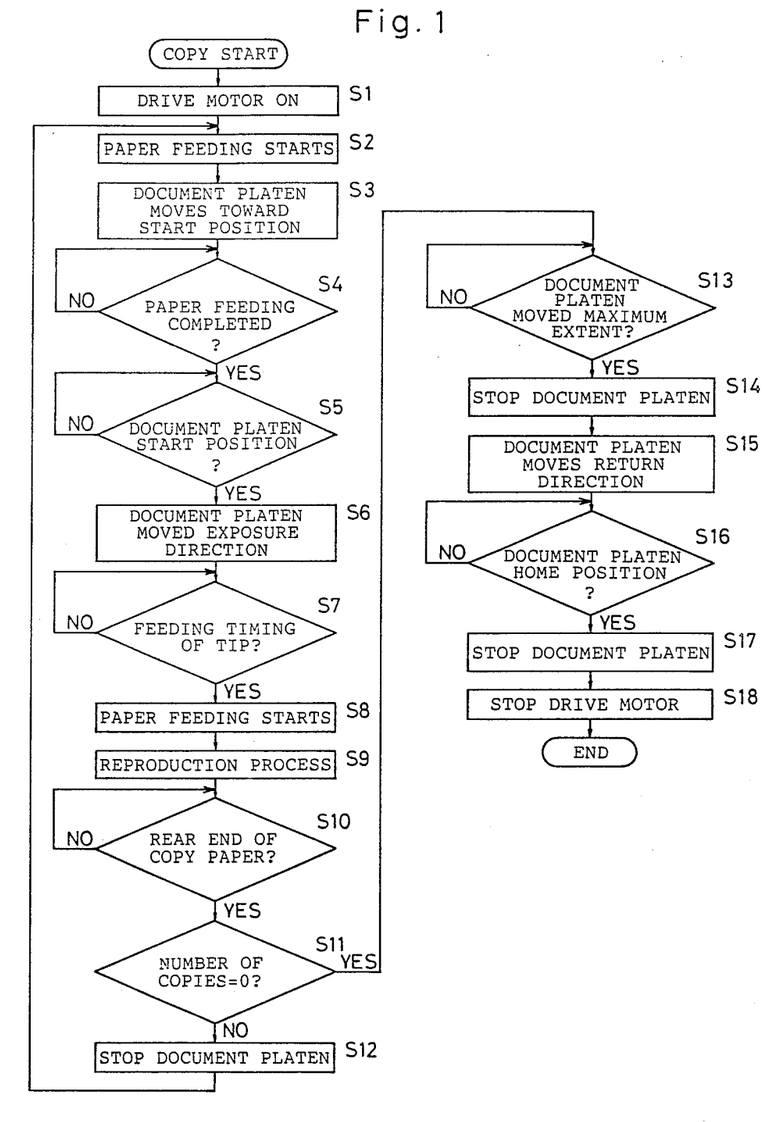
FIG. 1 is a flowchart of the control operations to be made in an electrophotographic copying machine in accordance with an embodiment of the present invention.

FIG. 1 is a flowchart of the control operations of the microcomputer 39 in FIG. 8.

The following description will discuss the characteristic operations of the electrophotographic copying machine 1 along the flow of the flowchart in FIG. 1 and with reference to FIG. 2 or FIG. 8 as necessary.

Upon start of reproduction, the microcomputer 39 drives the drive motor 41, enabling the document platen 3 and the paper feed mechanism 24 to be operable (Step S1). Then, an operation start signal is given to the paper feed mechanism 24, which in turn starts paper feeding (Step S2), and the document platen 3 starts moving toward the exposure start position (Step S3).

When the resist switch 28 (See FIG. 4) is turned ON by the tip end of copy paper thus fed, it is judged that paper feeding is completed (Step S4). When the position detector switch 32b is pushed and turned ON by the projection 34 of the document platen 3 (See FIG. 5), it is judged that the document platen 3 has arrived at the exposure start position (Step S5).

Then, the microcomputer 39 causes the document platen 3 to be moved in the exposure direction (Step S6). When the position detector switch 32a is turned ON by the projection 35 of the document platen 3 to determine the feeding timing of the tip of the copy paper (Step S7). The copy paper fed by the pair of resist rollers 27 of the paper feed mechanism 24 is delivered to the photoreceptor drum 18, and the next paper feeding starts (Step S8). Then, a reproduction process control known per se is executed (Step S9).

When the pair of resist rollers 27 feed the copy paper and the rear end of the copy paper is delivered, the resist switch 28 is turned OFF. By the resist switch OFF signal, the microcomputer 39 recognizes the rear end of the fed copy paper (Step S10), and then judges whether or not the number of copies previously set in the memory 40 has reached 0 (Step S11).

When the microcomputer 39 judges that the remaining number of copies is not 0 and reproduction is further to be made, the microcomputer 39 immediately stops the document platen 3 (Step S12) and executes again the processings above-mentioned from Step S2. Accordingly, the document platen 3 of the electrophotographic copying machine 1 is returned to the exposure start position, for the next reproduction, immediately after being moved for exposure by a distance corresponding to the document size. This enables to shorten the reproduction time required for a plurality of reproductions.

On the other hand, when the microcomputer 39 judges at the step S11 that the remaining number of copies to be made is zero, the microcomputer 39 causes the document platen 3 to be continuously moved, and it is waited until the document platen 3 is moved to a maximum extent in the exposure direction (Step S13).

Figure 7A:
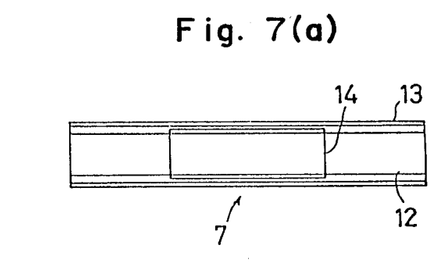
FIGS. 7(a), 7(A), 7(b), 7(B), 7(c), 7(C), 7(d), and 7(D), respectively, are different views illustrating the relationship between the document platen moving positions and the slide rail movements.
Figure 7B:
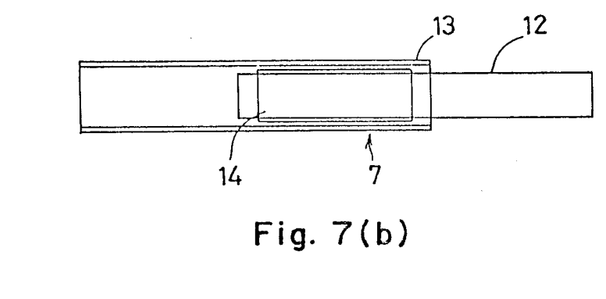
Figure 7C:
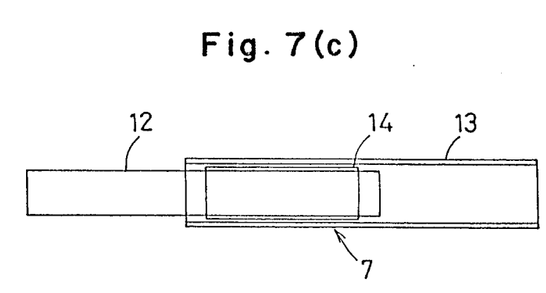
Figures 7C, 7D:
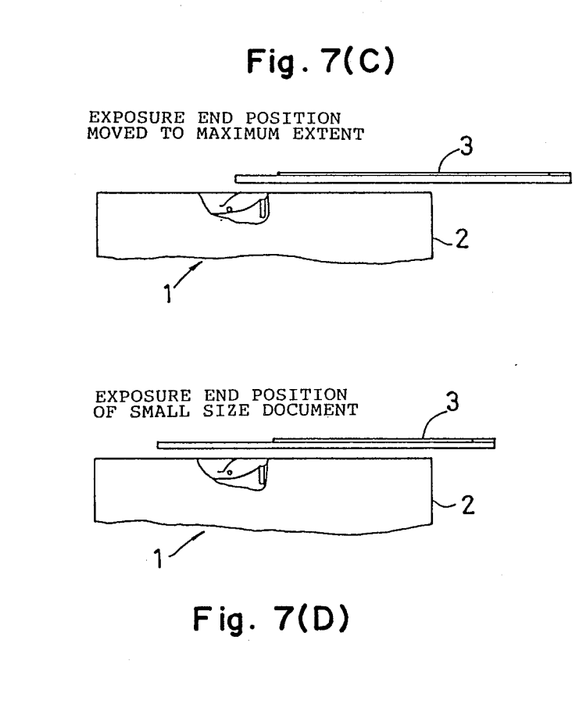
Figure 7D:
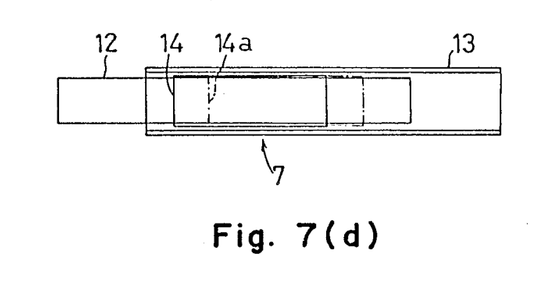

Thus, the document platen 3 is moved to a maximum extent in the exposure direction. Accordingly, even though the intermediate member 14 exhibits migration as shown in FIG. 7 (d), the outer member 13 is moved to the right-hand maximum moving position, thus eliminating the migration of the intermediate member 14.

At this time, a load is applied to the document platen 3 in the halfway of its movement. However, since the reproduction processing has been completed, there is no possibility of the reproduced image on the copy paper being positionally shifted or getting blurred.

When the document platen 3 is moved to a maximum extent in the exposure direction, the position detector switches 32a and 32b are turned ON by the projections 36 and 37 of the document platen 3. Accordingly, the microcomputer 39 stops the document platen 3 (Steps S13 and S14) based on the ON signals of the position detector switches 32a, 32b. This causes the document platen 3 to start moving in the return direction (Step S15).

When the position detector switch 32a is turned ON by the actuator projection 33 of the document platen 3, it is judged that the document platen 3 has reached the home position (Step S16). This causes the document platen 3 to be stopped (Step S17) and also causes the drive motor 41 to be stopped (Step S18).

In the control above-mentioned, when only one reproduction is made from a document instead of a plurality of reproductions, the document platen 3 is always moved to a maximum extent in the exposure direction regardless of the document size. In this connection, the reproduction speed in which one reproduction is completed, seems to be slow. As a matter of fact, as shown in FIG. 4 the copy paper after being subjected to the reproducing process undergoes such operations as delivery by the delivery belt 29 and discharged by the pair of discharge rollers 31 after the image has been fixed on this copy paper by the fixing device 30. This takes time more or less. In the control above-mentioned, the document platen 3 is moved to a maximum extent in the exposure direction and then returned, during such operations. Accordingly, there is no likelihood that the movement of the document platen 3 substantially causes the reproducing speed to be slow.

In the embodiment above-mentioned, when the remaining number of copies in a plurality of reproductions to be made, is not "0" as shown at Steps S11 and S12, the document platen 3 is stopped and moved in the return direction immediately after completion of document exposure. However, when exposing a document having an extremely small size, the document platen 3 may be moved, as it is, in the exposure direction even after completion of document exposure. In this case, when the document platen 3 has reached, for example, the home position, the document platen 3 may be stopped and then moved in the return direction. This is because there may be the following problems if the document platen 3 is stopped and moved in the return direction immediately after completion of document exposure when exposing the document having an extremely small size. That is, the slide rail mechanism repeats reciprocation with mincing steps corresponding to the small-size document. Accordingly, the relationship among the inner, outer and intermediate members is altered due to each backlash present between the intermediate member and the inner member and between the intermediate member and the outer member. The problems above-mentioned may be overcome by moving the document platen 3 by a relatively long distance to increase the distance of reciprocating movement of the respective members even when exposing a small-size document.

In accordance with the present invention, the document platen is moved to a maximum extent regardless of the document size at the time of the last reproducing operation in a series of reproducing operations. Accordingly, even though the slide rail mechanism for moving the document platen exhibits migration, the migration can be eliminated by the arrangement that the document platen is continuously moved up to the maximum moving position even after completion of the last exposure. This does not produce a failure in the subsequent reproduction. Further, the present invention can be embodied with the use of a simple software processing. This requires no modification in mechanism of a conventional electrophotographic copying machine. Thus, the present invention may be embodied economically.

What I claim is:

1. An electrophotographic copying machine having a document platen movable with respect to the body thereof, in which the document platen is adapted to be moved, in principle, by a distance corresponding to the size of a document mounted on the machine, comprising:

a slide rail mechanism connecting said document platen and said machine body, said mechanism including an outer member extending in the moving direction of said document platen and attached to either said document platen or said machine body, an inner member slidable with respect to said outer member, extending in the moving direction of said document platen and attached to either said machine body or said document platen, and an intermediate member inserted between said outer member and said inner member for assuring smooth slide of said inner member with respect to said outer member; and movement control means adapted to move said document platen to a maximum extent regardless of the document size at the time of the last reproducing operation in a series of reproducing operations.

2. An electrophotographic copying machine according to claim 1, wherein a series of reproducing operations refer to operations of serially reproducing one document on one or more copy paper sheets.

3. An electrophotographic copying machine according to claim 1, wherein a series of reproducing operations refer to operations of reproducing one document on one copy paper sheet.

4. An electrophotographic copying machine according to claim 1, wherein the movement control means is adapted to return the document platen in the return direction immediately after completion of exposure, for other reproducing operations than the last one in the series of reproducing operations.

5. An electrophotographic copying machine according to claim 1, wherein the movement control means is adapted to move the document platen to a predetermined position after completion of exposure, and then move the same in the return direction for other reproducing operations than the last one in a series of reproducing operations.

* * * * *